United States Patent

[11] 3,582,116

| [72] | Inventor | Stephen A. Young<br>c/o Stephen A. Young Corp., Flora, Ind. |
|---|---|---|
| [21] | Appl. No. | 818,901 |
| [22] | Filed | Apr. 24, 1969 |
| [45] | Patented | June 1, 1971 |

[54] STEM EXTENSION FOR PLUMBING FIXTURES
1 Claim, 3 Drawing Figs.

[52] U.S. Cl. .................................. 287/53, 251/293
[51] Int. Cl. ................................. F16d 1/06
[50] Field of Search ........................ 287/534, 53 (SPL); 251/293; 292/350

[56] References Cited
UNITED STATES PATENTS

| 313,722 | 3/1885 | Gordon | 287/53HX |
| 1,469,304 | 10/1923 | Hughes | 287/108 |
| 1,741,588 | 12/1929 | Schneider | 292/350X |
| 1,787,105 | 12/1930 | Delany | 287/53H |
| 1,878,569 | 9/1932 | Zolleis | 287/53H |
| 2,587,838 | 3/1952 | Green | 287/53SP |
| 796,111 | 8/1905 | Canfield | 287/53HX |

FOREIGN PATENTS

| 287,436 | 1931 | Italy | 287/53H |

Primary Examiner—David J. Williamowsky
Assistant Examiner—Andrew V. Kundrat
Attorney—Robb & Robb ABSTRACT: The invention disclosed herein relates to plumbing fittings and particularly to means for extending the length of stems thereon which might be necessitated because of the inaccuracy of mounting the valve body with which the stem is associated interiorly of the wall so that the same does not extend outwardly for enough therefrom to permit the installation and mounting of the usual escutcheon and handle on such stem. It is contemplated that the extension may be provided in any particular length desired and in various lengths where required to accommodate for the positioning of the valve body from which the main stem to be extended protrudes for the purposes set forth.

PATENTED JUN 1 1971 3,582,116

INVENTOR.
S. A. YOUNG
BY Robb & Robb
attorneys

STEM EXTENSION FOR PLUMBING FIXTURES

A particular object of the invention herein is to make possible the curing of defects which may arise from improper installation of valve bodies in domestic plumbing installations, which may be the result of several factors including improper location of the body within the partition provided to conceal the same, a variation in the actual thickness of the wall itself such as caused by heavy application of plaster, and also to accommodate for various different kinds of escutcheons usually associated with such fittings or fixtures.

A particular object of the invention is to provide a structure in which a stem extension of any preferred length may be used and in fact make possible the use of different lengths of extensions because of the possibility of variations in the position of the valve and the thickness of the wall as heretofore set forth, without necessitating complete changing of the valve stem initially supplied with the fitting by the provision of a member which may be installed upon the existing stem, provide a seat for the handle for operating the stem, and be connected to the main stem by a single member which will accomplish all of the required connecting actions heretofore described.

A particular object of the invention is to provide a stem extension which includes a female broached portion, adapted to seat upon the male broached portion of the stem to be extended, the extension itself involving a male broached portion which will receive and support a handle thereon for rotating of the now connected extension and main stem by a handle which handle will in turn be secured to the extension by a single member which will likewise maintain the extension in place upon the stem which is extended thereby.

Other and further objects of the invention will be understood from a consideration of the specification appended hereto and disclosed in the drawing wherein.

Figure 1:
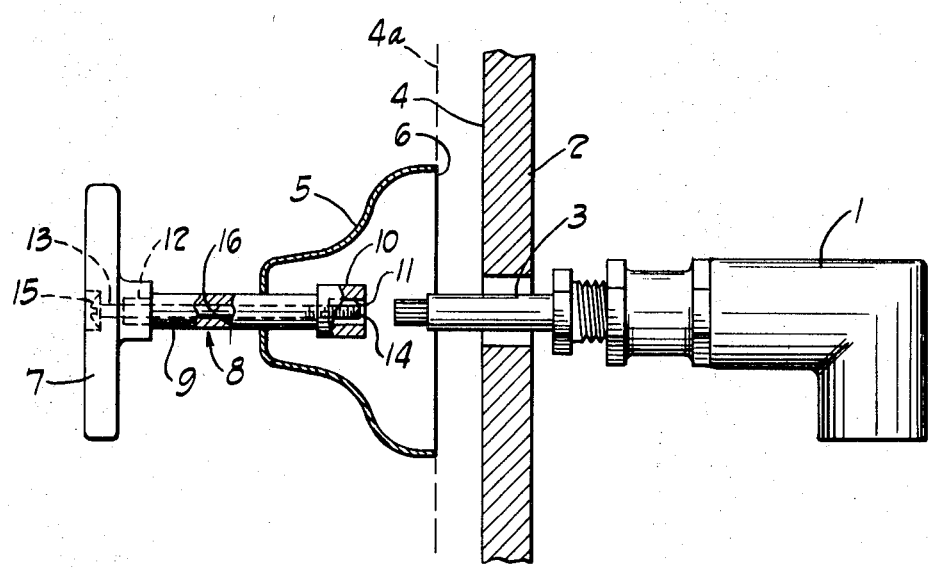
FIG. 1 is a partly fragmentary view illustrating a valve body of a particular fitting as being located within a wall and having the stem thereof extending through the surface of such wall and arranged with the extension thereon.
Figure 2:
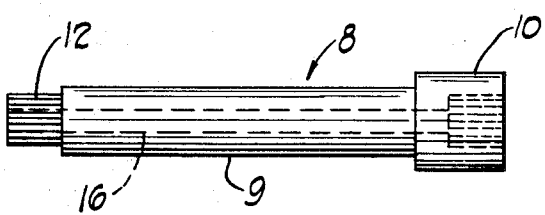
FIG. 2 is a view showing the extension as removed and in elevation.
Figure 3:
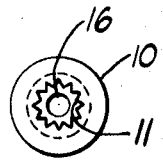
FIG. 3 is an end view of the stem extension shown in FIG. 2.

Referring to FIG. 1, a valve body of a fitting is shown and denoted at 1, which is mounted behind a wall surface generally suggested at 2, which may be of plaster or any composite thereof, the stem 3 of the fitting body 1 extending outwardly from the surface 4 of the wall 2.

For purposes of explaining the particular application of the stem extension of this invention hereto, it will be assumed that the surface 4 of the wall 2 is actually indicated by the dotted line suggested at 4a, and that thereby the escutcheon denoted 5 would normally seat thereagainst at its end denoted at 6.

It will be apparent if the valve body 1 and the stem 3 and escutcheon 5 are in the condition indicated, the broached portion 6 on the end of the stem 3 does not extend far enough to permit the mounting of a handle such as suggested by the fragment indicated at 7, upon such broached portion 6.

Therefore, it is desirable and under these conditions the extension hereof, and generally denoted 8 is particularly valuable since it will make possible the connecting of a handle and mounting of the necessary escutcheon without in turn involving the repositioning of the valve body 1 behind the wall 2.

With this in mind, therefore, the extension 8 is described as comprising a body portion 9, which is for the purposes hereof, cylindrical and somewhat elongated being of any preferred length so as to accomplish the purposes, having at one end a female broached portion 10 with a broach 11 therewithin, the broach 11 being of a size and properly proportioned to fit snugly and firmly on the broached portion 6 of the stem 3.

At the other end of the extension 8 and specifically of the portion 9 thereof, is a broached portion 12, which in all respects corresponds to the broached portion 6 of the stem 3, and thus will receive the handle suggested at 7 thereon, in place of positioning the handle 7 on the broached portion 6 previously referred to.

Since the escutcheon 5 is in place, the extension 8 will extend therethrough, and in all respects provide an appearance that the valve body 1 is in proper position if the stem extension hereof was not used.

In order to maintain the extension 8 and handle 7 in connection with the stem 3, a screw 13 is used, having the threaded end 14 thereon and the head 15 arranged as disclosed.

The head 15 is provided to maintain the handle 7 in place on the broach 12, it being apparent that the handle 7 is interiorly broached so as to mate with the broach 12, and the screw 13 will extend through a passage suggested at 16, so as to engage with the threaded opening in the area of the broached end 6 of the stem 3, such threaded opening being usually supplied to accept the usual handle set screw to maintain a handle in place upon such stem 3.

It will be apparent in this instance that the screw 13 accomplishes both the purpose of maintaining the handle 7 on the extension 8 and the extension 8 in connection with the stem 3.

It will be apparent from the foregoing that any length of extension 8 may be supplied to accommodate for varying positions of the valve body 1 for example, and likewise of course for varying lengths of the stem 3 which is initially provided in the valve body 1 for control purposes.

I claim:

1. In stem construction of the class described, in combination, a main stem member comprising an elongated rotatable part, reduced cylindrical handle receiving section thereon, means to support a handle on such section for rotating said part, a cylindrical extension member for said main member, said extension member having an enlarged cylindrical portion at one end engageable and disengageable with the main member, a reduced cylindrical handle engaging portion at the other end of said extension member whereby a handle mounted thereon will rotate both said members simultaneously, and a single means to retain a handle on the extension member and that member in operative engagement with the main member, the reduced cylindrical handle receiving section on the main member and the reduced cylindrical handle engaging portion on the extension member having substantially identical male splined formation thereon each reduced portion providing a shoulder for handle engagement, the enlarged cylindrical portion on the extension member engageable with the handle receiving section of said main member having a splined socket formation therein and having a shoulder thereon, the extension member having a longitudinal passage through which a screw may be entered, a screw in said passage, said screw constituting the single means aforesaid, the head of the screw retain the handle on the extension member, the other end of said screw connecting the such handle to the extension member and the extension member to the main stem member.